US011960612B2

(12) United States Patent
Savir et al.

(10) Patent No.: US 11,960,612 B2
(45) Date of Patent: Apr. 16, 2024

(54) ACCESS CONTROL FOR AIR-GAPPED COMPUTER SYSTEMS

(71) Applicant: Dell Products L.P., Round Rock, TX (US)

(72) Inventors: Amihai Savir, Newton, MA (US); Stav Sapir, Beer Sheva (IL); Naor Radami, Beer Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 17/667,859

(22) Filed: Feb. 9, 2022

(65) Prior Publication Data

US 2023/0252168 A1 Aug. 10, 2023

(51) Int. Cl.
*G06F 21/00* (2013.01)
*G06F 21/60* (2013.01)
*H04L 9/08* (2006.01)
*H04L 9/32* (2006.01)

(52) U.S. Cl.
CPC .......... *G06F 21/604* (2013.01); *H04L 9/0825* (2013.01); *H04L 9/3263* (2013.01); *G06F 2221/2141* (2013.01)

(58) Field of Classification Search
CPC .......... G06F 21/604; G06F 2221/2141; H04L 9/0825; H04L 9/3263; H04L 9/0894; H04L 9/3213; H04L 9/3247; G09C 5/00
See application file for complete search history.

(56) References Cited

U.S. PATENT DOCUMENTS

| 11,783,062 | B2* | 10/2023 | Lounsberry | G06F 21/6218 |
| | | | | 726/30 |
| 2008/0010233 | A1* | 1/2008 | Sack | G06F 21/6227 |
| 2010/0250497 | A1* | 9/2010 | Redlich | G06Q 10/06 |
| | | | | 707/661 |
| 2017/0310674 | A1* | 10/2017 | Markham | H04L 9/3247 |
| 2019/0121972 | A1* | 4/2019 | Norvill | G06F 21/554 |

(Continued)

OTHER PUBLICATIONS

D'Orazio et al., "Data Exfiltration From Internet of Things Devices: iOS Devices as Case Studies", IEEE Internet of Things Journal, vol. 4, No. 2, Apr. 2017.*

*Primary Examiner* — Morshed Mehedi
(74) *Attorney, Agent, or Firm* — Dergosits & Noah LLP; Todd A. Noah

(57) ABSTRACT

A system receives a request from a user to execute a command on an air-gapped computer system. If a role-based access control system permits the user to execute the command, the system prompts a number of approvers to determine whether to approve of the user executing the command. If a required number of approvers have approved of the user executing the command, the system encodes the command and incorporates the encoded command in an encoded message. The system uses a simplex communication output device to communicate the encoded message to a simplex communication input device for the air-gapped computer system. The system enables execution of the command by requesting the air-gapped computer system to execute the command, or by providing the user with an access token, received from the air-gapped computer system, which enables the user to physically access the air-gapped computer system and execute the command.

20 Claims, 4 Drawing Sheets

(56) References Cited

U.S. PATENT DOCUMENTS

| | | | |
|---|---|---|---|
| 2019/0199705 A1* | 6/2019 | Zhu | H04L 63/083 |
| 2021/0036860 A1* | 2/2021 | Ranganathan | H04L 63/102 |
| 2021/0211452 A1* | 7/2021 | Patel | H04L 63/1416 |
| 2022/0171863 A1* | 6/2022 | Green | G06F 21/31 |
| 2022/0182229 A1* | 6/2022 | Biham | H04L 9/3242 |
| 2022/0198015 A1* | 6/2022 | Webster | G06F 21/57 |

* cited by examiner

ACCESS CONTROL FOR AIR-GAPPED COMPUTER SYSTEMS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

A typical computer system is connected by a wireless network interface controller to a wired network, a modem, a nearby wireless network such as Wi-Fi, Bluetooth, or WiMAX, or any server system that has any communication mechanism to access the Internet and update software, even when the computer system is not plugged into a wired network. Since such a network connection is a security vulnerability for an attack via that communication system, a computer system can use an air gap or an air wall as a network security measure which physically isolates the computer system from any communication option such as unsecured computer networks, an unsecured local area network, or the Internet. The wireless interface controller in an air-gapped computer system has been disabled or removed, so that the air-gapped computer system has no functioning network interface, either wired or wireless, connected to any type of external network, and therefore prevents any means of access to attack. Consequently, an air-gapped computer system can be defined as a network-isolated electronic device environment which stores and processes data according to instructions from a software program.

Air-gapped computer systems are used for many types of practical purposes. For a backup data environment example, an air-gapped computer system is in a secure location and periodically closes its air gap for a short time only to request and/or receive backup data from client devices, then opens the air gap, which isolates the air-gapped computer system from external networks once again. Another use for air gaps is in electronic voting machines, which provide a display for voters to cast their votes while the electronic voting machines are disconnected from external networks to prevent vote tampering.

Like any computer system, system administrators and users need to execute various commands on an air-gapped computer system to receive alerts, run tests, and/or change configurations. To execute such commands, a system administrator or user can attain physical access to an air-gapped computer system and/or temporarily close the air gap, thereby connecting the air-gapped computer system remotely to external networks. However, an air-gapped computer system is designed to avoid closing the air gap unless absolutely necessary because any remote connection (such as a secure shell or email) requires a protocol handshake which attackers may use as an opportunity for attacking the air-gapped computer system. In another example, when polling stations are finished receiving votes and ready to output their vote counts, the voting machines' air gaps are closed, or a device is attached to the voting machines, which is when attacks can happen.

If there is no way to access an air-gapped computer system, then there is no way for an attacker to directly attack the air-gapped computer system. Consequently, attackers attempt to attack peripheral interfaces for an air-gapped computer system or use social engineering to trick a system administrator or user to disclose the system administrator or user's login credentials or to close the airgap for maintenance, which may enable the attackers to login and execute commands on the computer system. Another problem for air-gapped computer systems occurs when attackers attempt to generate incorrect results by falsifying outputs or statuses. When an attacker falsifies an error condition that requires a system administrator's intervention, the administrator sees the falsified error condition, and manually closes the airgap to connect to the computer system to respond to the falsified error condition, so the attacker waits for the gap to close and then attacks. The attacker can repeat this process until the attacker manages to gain access to the computer system. Even without attackers, system administrators and users may make mistakes that cause damage to sensitive data stored by an air-gapped computer system.

A computer system may use a role-based access control system, which can be defined as a group of related hardware components and/or software programs that restrict the use of computer resources based on organizational positions of the system resources' users. A role-based access control system creates specific roles for various positions within an organization, and assigns the permissions to perform specific functions on a computer system to the specific roles. The role-based access control system assigns specific roles to computer system users, and through these role assignments the users acquire the permissions needed to perform their specific functions. Since a role-based access control system does not directly assign permissions to system users to perform specific functions, the system users only acquire these permissions through their role assignments. Therefore, the management of a system user becomes a matter of simply assigning appropriate roles to users, which simplifies common administrative operations, such as adding a user or changing the organizational department of a user.

A role-based access control system facilitates the administration of security in large organizations with hundreds of computer system users and thousands of permissions to perform functions. Such a role-based access control system ensures that users access only the information they need to do their jobs, and prevents users from accessing sensitive data that does not pertain to their jobs. Since a role-based access control system uses a system user's role in an organization to determine the permissions that the user is granted, lower-level users cannot access sensitive information or perform high-level functions.

A computer system responds to a system user asserting the user's identity by using an authentication process to verify the asserted identity of the system user. The four categories of evidence which a system user provides for authentication processes are referred to as the four factors of authentication, which are something that a user knows, something that a user has, something that a user is or does, and somewhere that a user is. Each authentication factor covers a range of elements which a computer system uses to authenticate the asserted identity of a computer system user prior to granting the system user access to the computer system's resource.

Knowledge factors are based on something that a user knows, such as a password, a partial password, a pass phrase, a personal identification number, or an answer to a security question. Ownership factors are based on something that a user has, such as an identification card, a security token, a cell phone with a built-in hardware token, a software token, or a cell phone storing a software token. Inherent factors are based on something that a user is or does, such as a user's fingerprint, signature, retinal pattern, face, voice, unique bio-electric signals, other biometric identifiers, or DNA sequence, although there are various definitions of what is sufficient for the DNA sequence to be used for authentication. Location factors are based on somewhere that a user is, such as at a physical connection to a specific computing network or at a physical location identified by Global Positioning System (GPS) signals.

At the weakest level of authentication, a computer system uses only a single element from one of the four factors to authenticate a system user's asserted identity. Since the use of only one element from one authentication factor does not offer much protection from misuse or malicious intrusion, this type of authentication is not recommended for financial transactions or personally relevant transactions which warrant a higher level of security.

DETAILED DESCRIPTION

Embodiments herein enable access control for executing commands on air-gapped computer systems. A system receives a request from a user to execute a command on an air-gapped computer system. If a role-based access control system permits the user to execute the command, the system prompts a number of approvers to determine whether to approve of the user executing the command. If the required number of approvers have approved of the user executing the command, the system encodes the requested command and incorporates the encoded command in an encoded message. The system uses a simplex communication output device to communicate the encoded message to a simplex communication input device for the air-gapped computer system. The system enables execution of the command by requesting the air-gapped computer system to execute the command, or by providing the user with an access token, received from the air-gapped computer system, which enables the user to physically access the air-gapped computer system and execute the command.

For example, a system receives a request from a client computer for a system technician named Bob, who requests to execute a maintenance command on an air-gapped computer system. Since a role-based access control system permits system technicians to execute the maintenance command, the system prompts system administrators named Chris and Dana to determine whether they approve of the system technician's request to execute the maintenance command. Since the required number of two approvers, the system administrators named Chris and Dana, have approved of Bob the system technician executing the maintenance command, the system encodes the maintenance command and incorporates the encoded command in an encoded message which is formatted as a QR code. The system uses a display monitor to display the QR code to a camera for the air-gapped computer system. The system receives an access token, from the air-gapped computer system which temporarily closed the air gap, and provides the token to Bob, which enables Bob to physically access the air-gapped computer system in the secure location, and execute the requested maintenance command.

Figure 1:
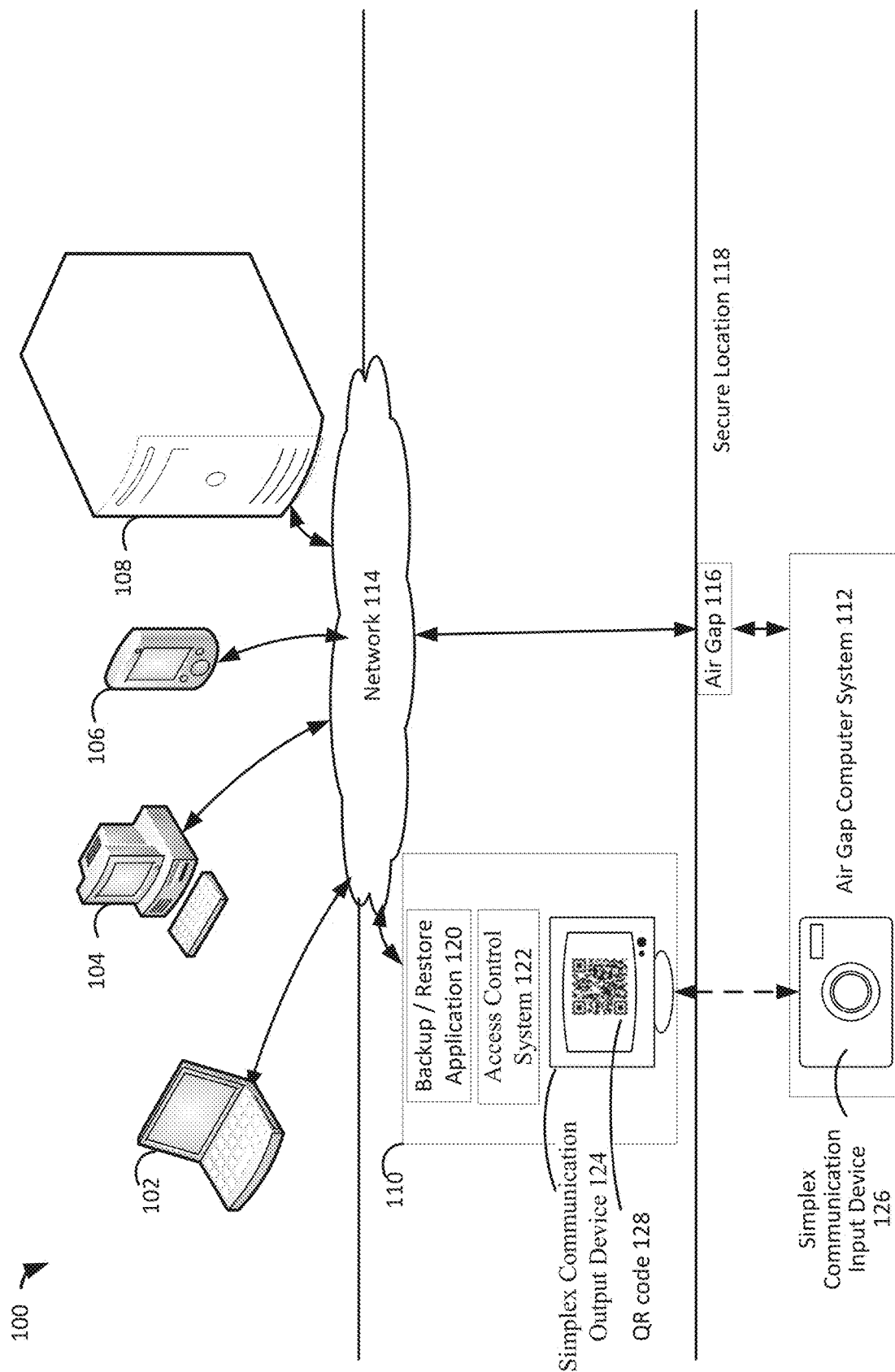
FIG. 1 illustrates a block diagram of an example system for access control for executing commands on an air-gapped computer system, under an embodiment.

FIG. 1 illustrates a diagram of a system 100 for access control for executing commands on air-gapped computer systems, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108, and a server 110, and an air-gapped computer system 112 which may be provided by a hosting company. The clients 102-108, and the server 110 communicate via a network 114. Even though FIG. 1 depicts the system 100 with four clients 102-108, one server 110, one air-gapped computer system 112, and one network 114, the system 100 may include any number of clients 102-108, any number of servers 110, any number of air-gapped computer systems 112, and any number of networks 114. The clients 102-108, the server 110, and the air-gapped computer system 112 may each be substantially similar to the system 300 depicted in FIG. 3 and described below.

The air-gapped computer system 112 is secured by an air gap 116 in a secure location 118, and may periodically close the air gap 116 to communicate with the server 110 and/or the clients 102-108 via the network 114. The air gap 116 is a physical disconnection of the network for the air-gapped computer system 112, which thereby prevents remote attacks. The network connection plug of the air-gapped computer system 112 may be literally pulled out to mechanically disconnect the air-gapped computer system 112 from any and all external networks.

The server 110 can include a backup/restore application 120, an access control system 122, and a simplex communication output device 124, while the air-gapped computer system 112 includes a simplex communication input device 126. Although FIG. 1 depicts the first client 102 as a laptop computer 102, the second client 104 as a personal computer 104, the third client 106 as a smartphone 106, and the fourth client 108 as a server 108, each of the clients 102-108 may be any type of computer. While FIG. 1 depicts the simplex communication output device 124 as a display monitor 124 and depicts the simplex communication input device 126 as a camera 126, the simplex communication output device 124 and the simplex communication input device 126 may communicate via other types of communications, such as auditory communications and other non-optical communications. Although FIG. 1 depicts the access control system 122 residing on the server 110, the access control system 122 may reside partially on the server 110 and partially on the clients 102-108, and partially on another server or completely on another server, which is not depicted by FIG. 1. Furthermore, the access control system 122 may include a role-based access control system or may separately access a role-based access control system, such as the role-based access control system described above.

The server 110, which may be referred to as a backup server 110, can include the backup/restore application 120 that creates backup files of data objects for the clients 102-108, and can execute a restore based on the backup files stored on the air-gapped computer system 112. The backup/restore application 120 provides centralized administration, such as scheduling, monitoring, and managing backup operations and backup files. The backup/restore application 120 enables the storing of backup operation schedules, client policies, and client configurations. The backup/restore application 120 provides a unique interface to the clients 102-108 during login, and assists the server 110 in authenticating and registering the clients 102-108.

The backup/restore application 120 can send backup/restore work orders to the clients 102-108, which may receive and process the work orders to start a backup or restore operation. The backup/restore application 120 can maintain a local database of all processes that execute on the backup server 110. The backup/restore application 120 may execute server-side processes for a system administrator's graphical management console, which may enable the system administrator to use command line interface tools for queries. For example, a system administrator identifies the clients 102-108 registered with the backup server 110.

A system user can enter their user credentials, such as a username and password, to log into any of the client 102, 104, 106, or 108, and request the execution of any number of commands on the air-gapped computer system 112 by describing the tasks that the system user plans on executing on the air-gapped computer system 112, describing which commands the system user intends to execute on the air-gapped computer system 112 to accomplish the planned tasks, and providing a justification for the planned tasks and commands. If the access control system 122 verifies that the commands requested by the system user are commands that a role-based access control system permits the system user to execute, then the access control system 122 can prompt a number of organization members to determine whether to sign digital certificates that indicate whether they approve of the request by the user to execute the requested commands on the air-gapped computer system 112 within a specific time period. The access control system 122 can determine the number of approvers to prompt, which could be any number of approvers, based on the sensitivity of executing the requested command, and also determine the time when the commands requested by the system user should be executed, which may be based on the times normally required to execute the requested commands, and/or times when the commands are normally executed.

Subsequently, the access control system 122 can determine whether the required number of approvers have logged in to their clients 102, 104, 106, and/or 108, and signed digital certificates to indicate that they approve of the request by the system user to execute the specific commands on the air-gapped computer system 112. The access control system 122 can determine the required number of approvers to approve of the request, which could be any required number of approvers, based on the sensitivity of executing the requested commands. The access control system 122 can determine if the required number of approvers have logged in to their clients 102, 104, 106, and/or 108, and vouched for the system user's request by signing digital certificates which indicate their approval of the request by the system user to execute the approved commands on the air-gapped computer system 112.

In response to determining that the required number of approvers have approved of the request, the access control system 122 can verify the identity of the requesting user and the identities of the required number of approvers who signed the required number of digital certificates, and encode the requested command and incorporate the encoded command in an encoded message which also incorporates the digital certificates signed by the approvers. The encoded message can contain an identifier of the system user who is approved to execute the requested commands on the air-gapped computer system 112, and a list of the approved commands that the system user is approved to execute, with any parameters required for executing the approved commands. Additionally, the encoded message can specify a one-instance limited duration of time for which a subsequent access token will be valid, which may require leveraging offline synchronization mechanisms such as tokens for the RSA (Rivest-Shamir-Adleman) public key cryptosystem. The intent of the encoded message is to significantly reduce the potential risk to data stored on the air-gapped computer system 112 by restricting the list of executable commands for each system user and the time for executing commands by the system user during an access session. The one-time use of an access token has a clear aim and timeline—the access is granted for a particular system user to execute a particular set of commands on the air-gapped computer system 112 during a particular limited time period.

The access control system 122 can format such an encoded message as a visual code, such as a QR code 128. A QR (Quick Response) code is a type of matrix barcode, or two-dimensional barcode, which is a machine-readable optical label that contains information about the item which it represents, such as user access and command execution details. In practice, the QR code 128 often contains data for a locator, identifier, or tracker that points to a website or application, and uses four standardized encoding modes (numeric, alphanumeric, byte/binary, and kanji) to store this data efficiently. Each QR code consists of black squares arranged in a square grid on a white background, which is read by an imaging device such as the camera 126, and processed until the image is appropriately interpreted, and the required data is extracted from patterns that are present in both the horizontal and vertical components of the visual code's image.

The access control system 122 can use a standard display monitor 124, which is connected to the World Wide Web, as the simplex communication output device 124 to display the QR code 128 to the air-gapped computer system 112. The air-gapped computer system 112 can use the camera 126 as the simplex communication input device 126 within the secure location 118, such as the camera 126 secured in a safe behind a small window for the camera lens, to read the QR code 128 without closing the air gap 116, thus maintaining physical isolation between the requesting system user and the air-gapped computer system 112. The QR code 128 is used as an example, but the encoded message may be implemented using other visual codes that have sufficient length, such as barcodes, JAB code, multi-colored HCC2D codes, PDF417, Aztec, or any other (2D) visual coding method. One reason for using a visual code to communicate with the air-gapped computer system 112 is that such a communication does not include any handshake—the air gap 116 is not closed and there is no communications negotiation or information exchange between the access control system 122 and the air-gapped computer system 112, which means that there is no surface of attack other than the encoded message, such as the QR code 128 itself.

The air-gapped computer system 112 can read the encrypted and encoded message, use cryptographic tools to decrypt and decode the message, and validate the authenticity of the decoded message, which may include verifying that the required number of approvers have signed digital certificates which indicate their approval of a request by a user to execute specific commands on the air-gapped computer system 112. Then the air-gapped computer system 112 can extract the approved commands from the decoded message. The air-gapped computer system 112 can continue by executing the extracted commands, and then terminating the approved user's access session when the corresponding access time expires. Alternatively, the air-gapped computer system 112 can respond by providing an access token that enables the requesting user to access the secure system location 118 and access a login page which prompts the user to be authenticated by entering the user's credentials (such as a username and password) that matches the user's credentials which are listed in the decoded message. Once the login page for the air-gapped computer system 112 is used and authenticates the user, the air-gapped computer system 112 can enable the approved user to execute the approved commands, after which the air-gapped computer system 112 can terminate the approved user's access session when the expired time matches the approved access time.

Since the display monitor 124 for the access control system 122 can communicate an encoded message formatted as the QR code 128 to the camera 126 for the air-gapped computer system 112, an attacker may attack the display monitor 124, which is on an unsecured network, and attempt to falsify the QR code 128. Therefore, the air-gapped computer system 112 may attempt to ensure that the encoded message that is formatted as the QR code 128 indicates the required number of approvals by approvers who use the clients 102-108 which communicate through the access control system 122, and without any indication of QR code tampering.

Therefore, an asymmetric encryption algorithm can generate a pair of cryptographic keys as two corresponding parts, a public key and a private key. A system user can use the private key to sign data objects or messages, and then anyone with the public key corresponding to the private key may verify that the signed data object or message was created by someone possessing the corresponding private key. If this verification process is combined with a proof of identity system to identify what entity, person, or group owns the private key, then the access control system 122 can authenticate the entities which provided and signed the encoded message and the entities which approved and signed the digital certificates for the request to execute the command. Any asymmetric cryptography signing method may be used, such as the RSA (Rivest-Shamir-Adleman) public key cryptosystem or the ECDSA. (Elliptic Curve Digital Signature Algorithm).

After an approver uses a private key stored on one of the clients 102-108 to sign a digital certificate to indicate the approval of a user's request to execute a command on the air-gapped computer system 112, the access control system 122 can generate an encoded message which can include any signed digital certificates, and communicate the encoded message, such as using the display monitor 124 to display the QR code 128 to the camera 126 of the air-gapped computer system 112. Then the air-gapped computer system 112 can use the public key which corresponds to the private key to verify the signatures of the required number of approvers on digital certificates, which indicates their approval of the user executing the requested command, without any indication of tampering, and that the QR code 128 specifies a one-time use of access time that is still valid, and which prevents replay attacks.

Even if the public key for signing digital certificates is not compromised, a second set of private-public keys may be provided for additional security by encrypting the encoded message that may be formatted as the QR code 128. After using an asymmetric encryption algorithm to generate a public key and a private key, someone with the public key can encrypt a data object or a message, which may be formatted as visual code such as the QR code 128, thereby providing confidentiality, and then only a person in possession of the corresponding private key can decrypt the encrypted data object or message which may be formatted as a visual code, such as QR 128. Therefore, the access control system 122 can use an asymmetric public cryptographic key to encrypt an encoded message formatted as visual code, such as the QR code 128, and use the display monitor 124 to display the encrypted message to the camera 126 for the air-gapped computer system 112. Then the air-gapped computer system 112 can use the corresponding private cryptographic key to decrypt the corresponding encrypted and encoded message and ensure the integrity of the encoded message.

Without any direct network connection to the air-gapped computer system 112, the access control system 122 can use a role-based access control system and generate cryptographically signed messages, which may be formatted as QR code and encrypted, which can be displayed by the display monitor 124 and captured by the camera 126 for the air-gapped computer system 112, without closing the air gap 116 for the air-gapped computer system 112. Therefore, the access control system 122 and the air-gapped computer system 112 can maintain a physical separation yet still allow system administrators and users to communicate with and securely access the air-gapped computer system 112 to execute specific commands which accomplish a specific task, without exposing the air-gapped computer system 112 to any unsecured network. The access control system 122 and the air-gapped computer system 112 can use multi-factor authentication, which involves two or more of the four authentication factors, to authenticate a user, and then provide the authenticated user with a single-use access to the air-gapped computer system 112 in a secure location 118.

The username and password which a user enters to login to any of the clients 102-108 to request executing a command on the air-gapped computer system 112, the username and password which any approver enters to login to any of the clients 102-108 to approve of the user executing the requested command, and the username and password which the user may enter in a login page for the air-gapped computer system 112 are knowledge factors because they are something that a user knows. The private keys which approvers can use to sign digital certificates on any of the clients 102-108 are ownership factors because they belong to the clients 102-108 used by system users. A public key which the access control system 122 uses to encrypt encoded messages, a private key which the air-gapped computer system 112 uses to decrypt encrypted messages, and a public key which the air gapped computer system 112 uses to authenticate the identities of system users who signed digital certificates or the encoded message, are ownership factors. These public and private keys are ownership factors because they belong to the clients 102-108, the server 110, the air-gapped computer system 112, and the access control system 122, and are too complicated for any human to understand completely or commit to memory as a knowledge factor.

The encoded message, such as the QR code 128, which the access control system 122 generates on behalf of a user who is requesting to execute a command on the air-gapped computer system 112 is an ownership factor because the encoded message belongs to the access control system 122 and is communicated on behalf of the requesting user. The access token which the air-gapped computer system 112 generates to enable the requesting user to gain access to the secure location 118 where the air-gapped computer system 112 is located is an ownership factor because the access token belongs to the air-gapped computer system 112 which provides the access token to the requesting user. The secure location 118 where the air-gapped computer system 112 is located is a location factor because it is somewhere that a user can be. Access to the secure location 118 may be restricted based on authentication of a user's biometric identifiers, such as devices which authenticate a user based on recognizing the user's fingerprints, retinal pattern, signature, and/or face, which are inherent factors because they are something that a user is.

Determining the number of authentication factors used by the air-gapped computer system 112 and the access control system 122 depends on how the authentication factors are counted. For example, all of the credentials entered by users may be counted as a single knowledge factor, and all of the keys used to sign the digital certificates, sign the encoded message, encrypt and decrypt the coded message, and verify signatures may be counted as a single ownership factor. The secure location 118 of the air-gapped computer system 112 is counted as a single location factor, which may be combined with the knowledge factor and the ownership factor to result in a total of three authentication factors being used.

In an alternative example, if the instance when the system technician entered credentials to request to execute the maintenance command, the two instances when the system administrators entered their credentials to approve of the request of the system technician to execute the command, and the instance when the system technician entered credentials to the login page of the air-gapped computer system 112 to request to execute the maintenance command, are counted separately, then a total of four instance of the knowledge factor are used. If the instance when the system technician used a private key to sign the request to execute the maintenance command, the two instances when the system administrators used private keys to sign digital certificates, the instance when the access control system 122 used a public key to encrypt the encoded message, the instance when the air-gapped computer system 112 used a private key to decrypt the encrypted message, and the instance when the air-gapped computer system 112 used a public key to verify the signatures in the decrypted message are counted separately, then six instances of the ownership factor were used. The secure location 118 of the air-gapped computer system 112 is counted as a single instance of the location factor, which may be combined with the four instance of the knowledge factor and the six instances of the ownership factor to result in a total of eleven instances of authentication factors being used.

Although the following paragraphs describe Dell Corporation's PowerProtect® backup/restore application, Dell Corporation's NetWorker® backup/restore application, and Dell Corporation's Avamar® backup/restore application as examples of the backup/restore application 120, the backup/restore application 120 may be any other type of backup/restore application which provides the backup/restore functionalities described in the Background section. The backup server 110 may be any other type of backup server which provides the backup/restore functionalities described in the Background section.

The backup/restore application 120 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 120 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 120 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk for 6 months, store a primary clone of the backup copies onto the second disk for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored, such as the air gapped computer system 112.

Figure 2A:
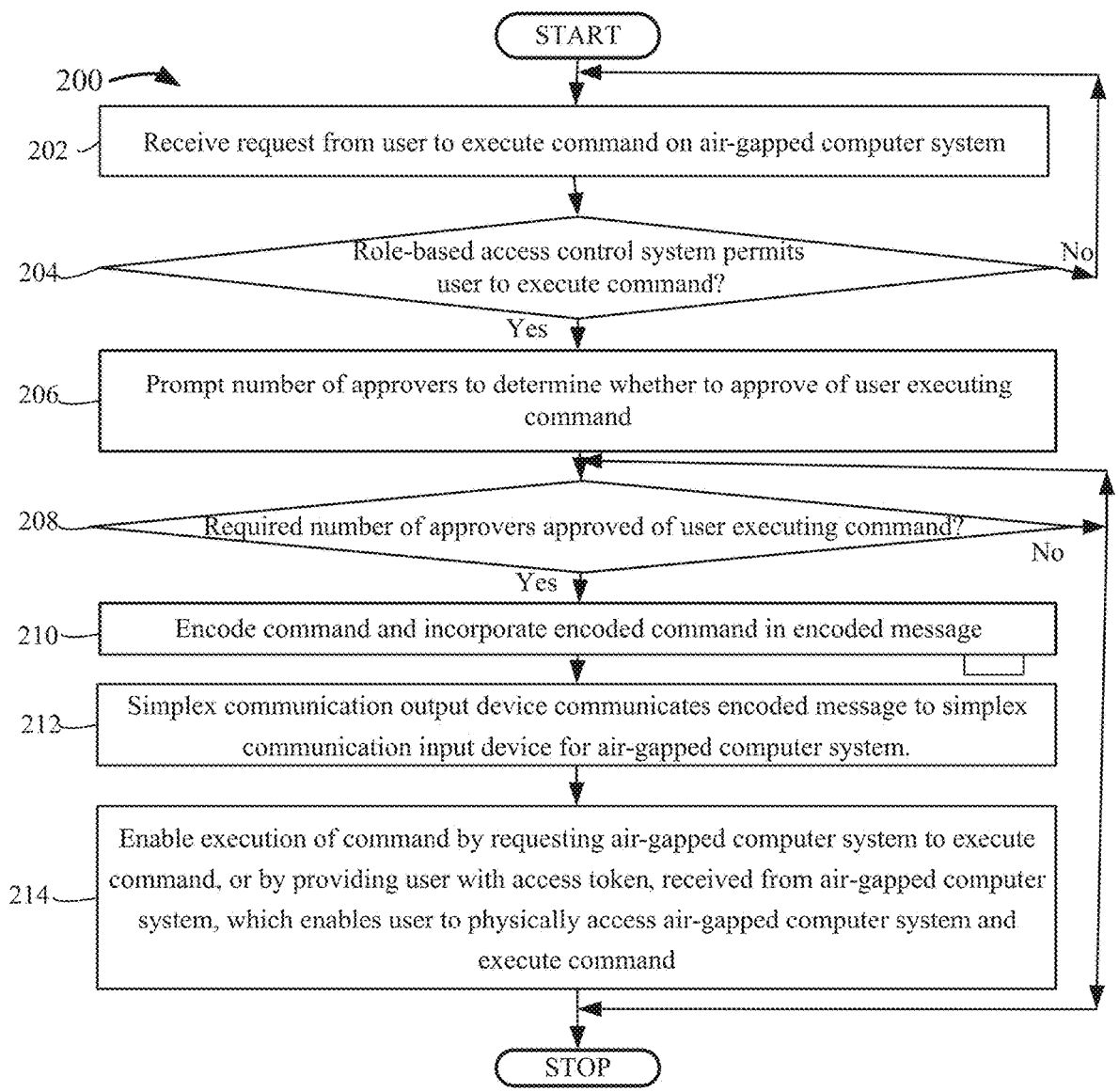
FIG. 2A and FIG. 2B are flowcharts that illustrate methods of access control for executing commands on air-gapped computer systems, under an embodiment.

FIG. 2A is a flowchart that illustrates a method for access control for executing commands on air-gapped computer systems, under an embodiment. Flowchart 200 depicts method acts illustrated as flowchart blocks for certain steps involved in the clients 102-108, the server 110, the air-gapped computer system 112, and/or the network 114, of FIG. 1.

A request is received from a user to execute a command on an air-gapped computer system, block 202. A system receives users' requests to access an air-gapped computer system. For example, and without limitation, this can include the access control system 122 receiving a request from the client 202 for a system technician named Bob to execute a maintenance command on the air-gapped computer system 112.

A request can be an instruction to a computer to provide information or perform another function. A user can be a person who operates a computer. A command can be an instruction or signal that causes a computer to perform one of its basic functions.

After receiving a request from a user to execute a command on an air-gapped computer system, a determination is made whether a role-based access control system permits the user to execute the requested command, block 204. The system determines whether a role-based access control system permits the user's requested command to be executed on an air-gapped computer system. By way of example and without limitation, this can include the access control system 122 determining whether a role-based access control system permits a specific system technician to execute the maintenance command. If the role-based access control system permits a user to execute a requested command, the method 200 continues to block 206 to prompt a number of approvers to determine whether to approve of the user's request. If the role-based access control system does not permit the user to execute the requested command, the method 200 returns to block 202 to receive the next user's request to access the air-gapped computer system 112.

If the role-based access control system permits the user to execute the command, then a number of approvers are prompted to determine whether to approve of the user executing the command, block 206. The system determines whether the requesting user is approved to execute the requested command based on evaluations by the user's coworkers. In embodiments, this can include the access control system 122 prompting system administrators named Chris and Dana to determine whether to approve of the request from Bob the system technician to execute the maintenance command. An approver can be a person who endorses or gives permission for something. A number can be an arithmetical value, expressed by a word, symbol, or figure, representing a particular quantity.

The number of approvers who are prompted to approve of the user executing the command may be based on the sensitivity of executing the command. For example, a system administrator named Ann determines that two system administrators will be prompted to approve a system technician's request to execute a routine maintenance command. In another example, Ann the system administrator determines that three system administrators will be prompted to approve a system technician's request to execute a somewhat complex filesys command. In yet another example, the system administrator determines that only one system administrator will be prompted to approve a system technician's request to execute a simple status request command.

An approver may sign a digital certificate to approve of the user executing the command. For example, the system administrator named Chris enters user credentials information to login to the client 106 to sign a digital certificate which indicates approval of the request from Bob the system technician to execute the maintenance command. A digital certificate can be an electronic document which includes information about the identify of its owner.

Following the prompting of a number of approvers to determine whether to approve of the user executing the command, whether a required number of approvers have approved of the user executing the command is determined, block 208. The system distributes the responsibility among the user's coworkers to approve of the user's requested command. For example, and without limitation, this can include the access control system 122 determining whether the required number of two approvers, the system administrators named Chris and Dana, have approved the request from Bob the system technician to execute the maintenance command.

The required number of approvers to approve of the user executing the command may be based on the sensitivity of executing the command. For example, the system administrator named Ann determines that only two system administrators will be required to approve a system technician's request to execute a routine maintenance command. In another example, Ann the system administrator determines that three system administrators will be required to approve a system technician's request to execute a somewhat complex filesys command. In yet another example, Ann the system administrator determines that only one system administrator will be required to approve a system technician's request to execute a simple status request command. A required number can be an arithmetical value, expressed by a word, symbol, or figure, representing a particular quantity that is considered essential for something.

The number of approvers who are prompted to approve of the user executing the command may be different from the required number of approvers to approve of the user executing the command. For example, Ann the system administrator configures the access control system 122 to prompt three system administrators to approve of any system technician executing the maintenance command and to require only two system administrator to approve of any system technician executing the maintenance command. When the access control system 122 is configured in this manner, Bob the system technician can still have his request to execute the maintenance command approved by two system administrators even if one of the three system administrators will not be available for work again until the following week.

If the required number of approvers have approved of the user executing the command, the method 200 continues to block 210 to encode the command and incorporate the encoded command in an encoded message. If the required number of approvers has not approved of the user executing the command, the method 200 either waits for approval or terminates if the approval waiting time has expired.

If the required number of approvers have approved of the user executing a command, the command is encoded and the encoded command is incorporated in an encoded message, block 210. The system responds to approval of the request by the user to execute the command by encoding the command and incorporating the encoded command in an encoded message. By way of example and without limitation, this can include the access control system 122 encoding the maintenance command, which was requested by Bob the system technician, and incorporating the encoded maintenance command in an encoded message because the required number of two approvers, Chris and Dana, have approved of Bob the system technician executing the maintenance command. An encoded message can be a conveying of information which is converted to a particular format.

An encoded message may include an identifier of the user, a list of commands that the user is approved to execute, and a time for executing a command. For example, the encoded message includes Bob's username and password, a list of the maintenance and filesys commands that Bob is approved to execute, and an indication of 15 minutes access time for executing the commands by a deadline of 6:00 A.M. the next morning at the latest. An identifier can be a sequence of characters used to refer to an entity. A list can be a number of related items written or printed consecutively. A time can be a clearly identified chronological point or duration as measured in hours and minutes, such as midnight or 15 minutes.

A private key enables an approver to sign a digital certificate which is incorporated in an encoded message, and a corresponding public key enables the air gapped computer system 112 to verify that the required number of approvers signed digital certificates to approve of a user executing a command. For example, the system administrator named Chris uses a private key to sign a digital certificate which indicates Chris' approval of Bob the system technician executing the maintenance command. A public key may enable encrypting the encoded message and a corresponding private key may enable the air-gapped computer system 112 to decrypt an encrypted message. For example, the access control system 122 uses a public key to encrypt the encoded message about the system technician named Bob requesting to execute the maintenance command, and the corresponding private key enables the air-gapped computer system 112 to decrypt the encrypted message. A private key can be a cryptographic set of instructions used by a particular recipient to sign data objects/messages or to decrypt an encrypted message. A public key can be a cryptographic set of instructions that is obtained and used by anyone to verify that a data object/message was created and/or signed by someone possessing the corresponding private key, or to encrypt messages intended for a particular recipient.

Having encoded a command which is incorporated in an encoded message, a simplex communication output device communicates the encoded message to a simplex communication input device for an air-gapped computer system, wherein the encoded message may be formatted as a visual code, the simplex communication output device may be a display monitor, and the simplex communication input device may be a camera, block 212. The system communicates an encoded message to an air-gapped computer system without closing any air gap. In embodiments, this can include the access control system 122 using the display monitor 124 to display the encoded message formatted as the QR code 128 to the camera 126 for the air-gapped computer system 112.

A visual code can be a system of replacement words, letters, figures, and/or other symbols substituted for original words, letters, figures, and/or other symbols, especially for the purposes of secrecy. A simplex communication output device can be a channel that conveys data in one direction by only sending the data. A display monitor can be an output device that depicts information in pictorial, symbolic, and/or text format. A simplex communication input device can be a channel that conveys data in one direction by only receiving the data. A camera can be an optical instrument that captures a visual image.

In addition to communicating the encoded message to the air-gapped computer system, execution of the command is enabled by requesting the air-gapped computer system to execute the command or by providing the user with an access token, received from the air-gapped computer system, which enables the user to physically access the air-gapped computer system and execute the command, block 214. The system enables either the air-gapped computer system or the user to execute the requested command. For example, and without limitation, this can include the access control system 122 receiving an access token, from the air-gapped computer system 112 which temporarily closed the air gap 116, which the access control system 122 provides to Bob the system technician, which enables Bob to physically access the air-gapped computer system 122 in the secure location 118 and execute the requested maintenance command. Alternatively, the encoded message includes a request to execute the command, which enables the air-gapped computer system 112 to execute the maintenance command, which is also in the encoded message.

An access token can be information which functions as a ticket, by providing its owner with the ability to make use of a resource. Consequently, the access control system 122 either enables the air-gapped computer system 112 to automatically execute the user's requested command after receiving and processing the encoded message, or provides an access token to the approved user which enables the user to the gain physical access to the air-gapped computer system 112 in the secure location 118 and then execute the requested command on the air-gapped computer system 112.

Figure 2B:
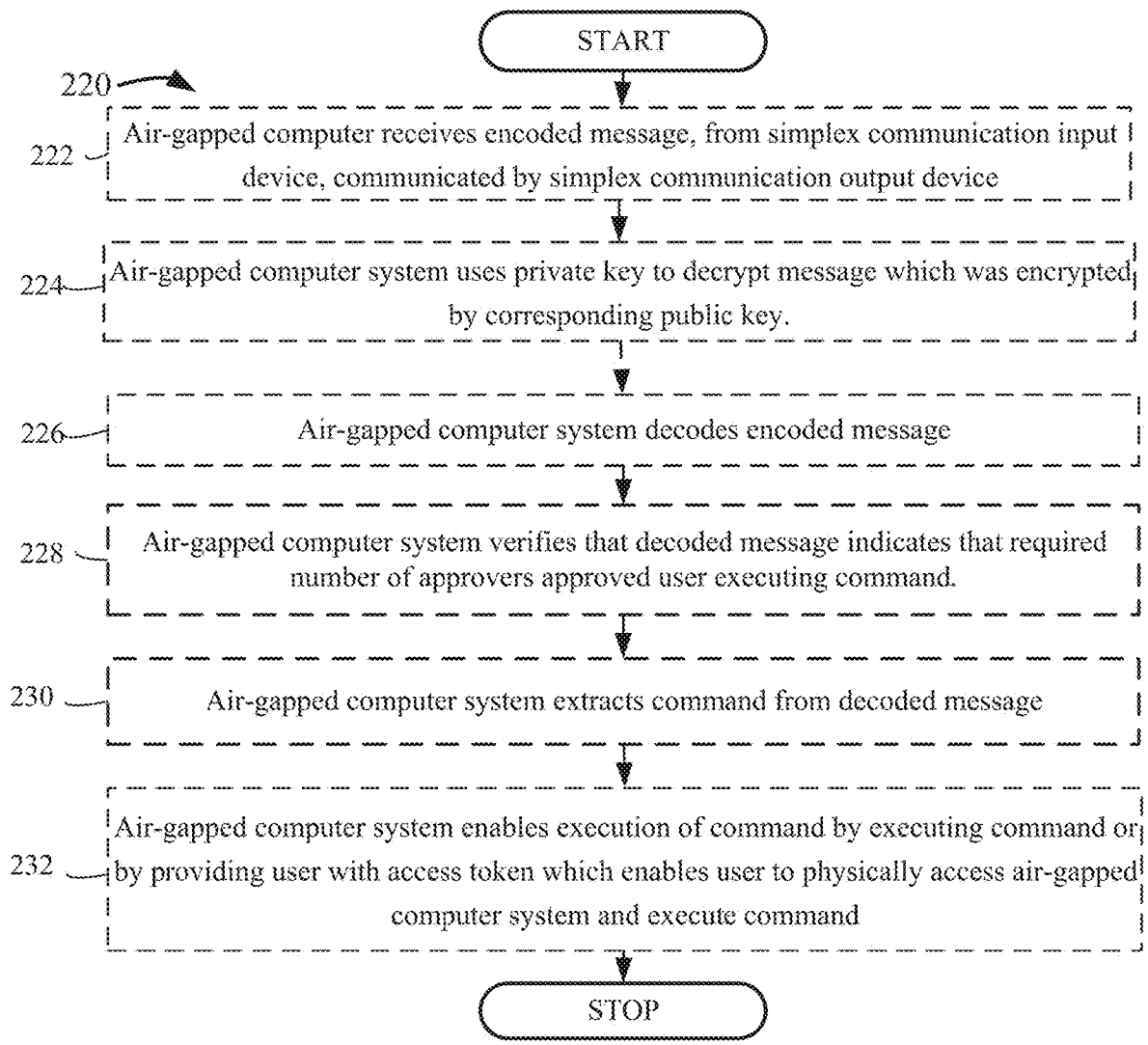

FIG. 2B is a flowchart that illustrates a method for access control for executing commands on air-gapped computer systems, under an embodiment. Flowchart 220 depicts method acts illustrated as flowchart blocks for certain steps involved in the clients 102-108, the server 110, the air-gapped computer system 112, and/or the network 114, of FIG. 1.

While an encoded message is being communicated, an air-gapped computer system can receive, from a simplex communication input device, the encoded message communicated by a simplex communication output device, block 222. The air-gapped computer system can receive an encoded message formatted as the QR code 128. For example, and without limitation, this can include the air-gapped computer system 112 using the camera 126 to receive an encoded message formatted as the QR code 128 from the display monitor 124. The encoded message may contain an identifier of a requesting user, a list of the commands that the user is approved to execute, and a time period for executing the commands. For example, the encoded message includes Bob's username and password, a list of the maintenance and filesys commands that Bob is approved to execute, and an indication of 15 minutes to access the air-gapped computer system 112, and execute the maintenance and filesys commands, which need to be executed by 6:00 A.M. the following morning at the latest.

After receiving an encrypted and encoded message, an air-gapped computer system can use a private key to decrypt the encrypted and encoded message, which was optionally encrypted by a corresponding public key, block 224. The air-gapped computer system can decrypt the received QR code 128 if this code is encrypted. By way of example and without limitation, this can include the air-gapped computer system 112 using a private key to decrypt the encrypted QR code 128 which represents the approval of the request from Bob the system technician to execute the maintenance command.

Following receipt of an encoded message, an air-gapped computer system can decode the encoded message, block 226. The air-gapped computer system can decode an encoded message which could be formatted as visual code. In embodiments, this can include the air-gapped computer system 112 decoding the QR code 128 which represents the approval of the request from Bob the system technician to execute the maintenance command. The encoded message may be formatted as a visual code, the simplex communication output device may be a display monitor, and the simplex communication input device may be a camera.

Having decoded an encoded message, an air-gapped computer system can verify whether the decoded message indicates that a required number of approvers have approved of a user executing a command, wherein a public key may enable the air-gapped computer system to verify that an approver used a corresponding private key to sign a digital certificate to approve of the user executing the command, block 228. The air-gapped computer system can verify that approvers have approved of the execution of a requested command on the air-gapped computer system 112. For example, and without limitation, this can include the air-gapped computer system 112 verifying that the decoded QR code 128 indicates that the system administrators Chris and Dana signed digital certificates to indicate their approval of the request made by Bob the system technician to execute the maintenance command.

In addition to verifying information in the decoded message, an air-gapped computer system can extract an approved command from the decoded message, block 230. The air-gapped computer system can extract approved commands from the decoded message which is formatted as visual code. By way of example and without limitation, this can include the air-gapped computer system 112 extracting the approved maintenance command from the decoded QR code 128. Alternatively, the air-gapped computer system 112 can map the decoded message's relevant information into a user profile with certain permissions to execute the commands for a limited time, and also generate an access token that enables the user to execute the requested commands. When the requesting user subsequently gains physical access to the secure location 118 for the air-gapped computer system 112 and enters information in the login page, the air-gapped computer system 112 can compare the decoded information mapped to the user profile against the information that the user entered in the login page to authenticate the user, and enable the user to execute the requested commands during the specified time before the access termination deadline. Information can be data. Decoded information can be data converted to another format. A specified time can be a clearly identified chronological duration as measured in hours and minutes, such as 15 minutes.

After extracting a command from a decoded message, execution of the command may be enabled by the air-gapped computer system executing the command or by providing the user with an access token, which can enable the user to physically access the air-gapped computer system and execute the command, block 232. The air-gapped computer system can execute the user's command or provides an access token to a user which enables the user to execute the command. For example, and without limitation, this can include the air-gapped computer system 112 executing the maintenance command which is in the encoded message because the encoded message also includes a request to execute the command. Alternatively, the access control system 122 closes the air gap 116 temporarily to provide an access token to Bob the system technician, which enables Bob to physically access the air-gapped computer system 122 in the secure location 118, and execute the requested maintenance command. Consequently, the air-gapped computer system 112 can automatically execute the user's requested command after receiving and processing the encoded message or provide an access token to an approved user which enables the user to the gain physical access to the air-gapped computer system 112 in the secure location 118 and then execute the requested command on the air-gapped computer system 112.

Although FIGS. 2A-B depict the blocks 202-214 and 220-232 occurring in a specific order, the blocks 202-214 and 220-232 may occur in another order. In other implementations, each of the blocks 202-214 and 220-232 may also be executed in combination with other blocks and/or some blocks may be divided into a different set of blocks.

Figure 3:
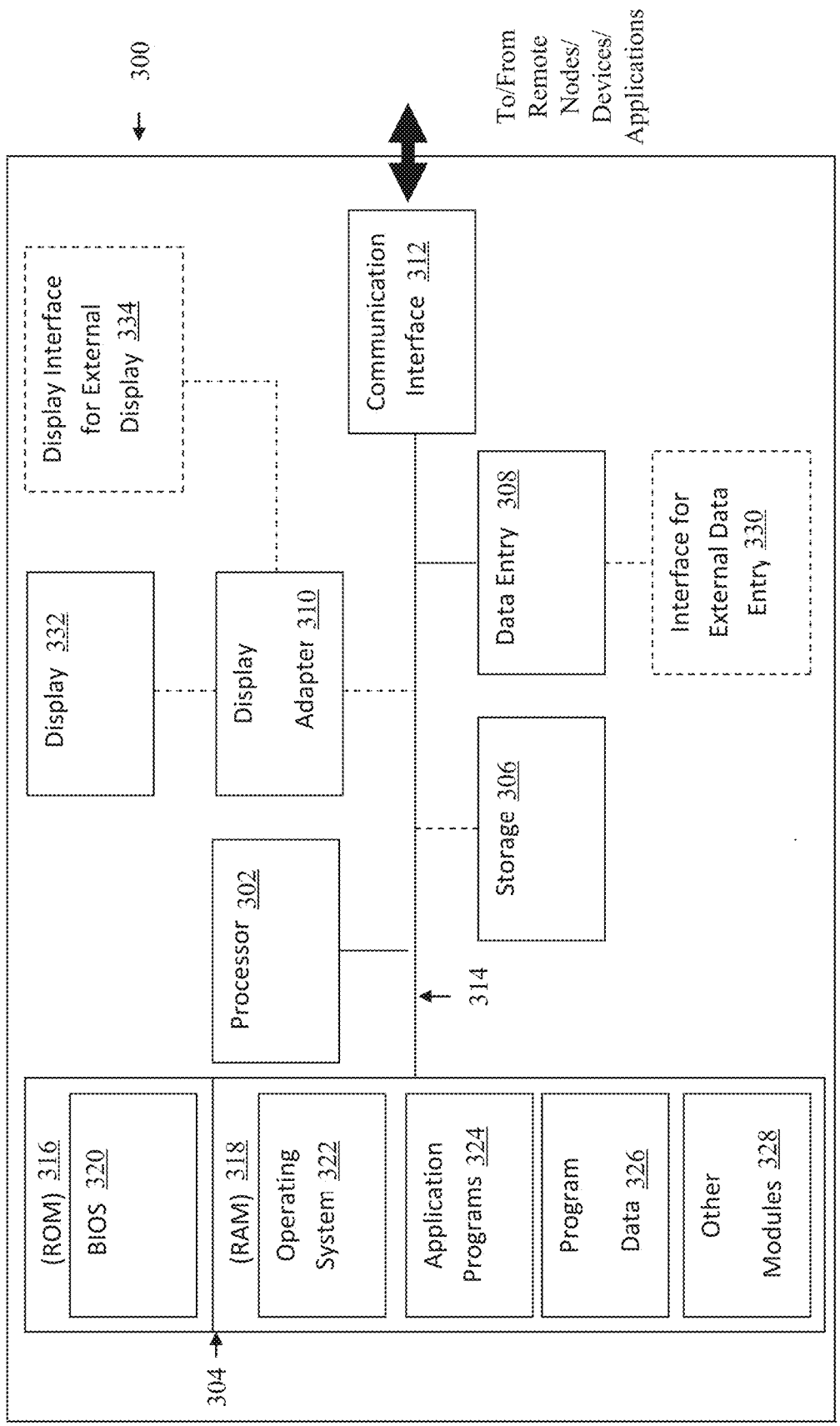
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 300. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330.

By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device, or other common network node, and typically includes many or all the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

The arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for access control for executing commands on air-gapped computer systems, comprising:
    one or more processors; and
    a non-transitory computer readable medium storing a plurality of instructions, which when executed, cause the one or more processors to:
    determine whether a role-based access control system permits a user to execute a command on an air-gapped computer system, in response to receiving a request from the user to execute the command;
    prompt a number of approvers to determine whether to approve of the user executing the command, in response to a determination that the role-based access control system permits the user to execute the command;
    encode the command and incorporate the encoded command in an encoded message, in response to a determination that a required number of approvers have approved of the user executing the command;
    communicate, by a simplex communication output device, the encoded message to a simplex communication input device for the air-gapped computer system; and
    enable execution of the command by one of requesting the air-gapped computer system to execute the command, and providing the user with an access token, received from the air-gapped computer system, which enables the user to physically access the air-gapped computer system and execute the command.

2. The system of claim 1, wherein an approver signs a digital certificate to approve of the user executing the command.

3. The system of claim 1, wherein the number of approvers prompted to determine whether to approve of the user executing the command and the required number of approvers who have approved of the user executing the command are based on a sensitivity of executing the command.

4. The system of claim 1, wherein the encoded message comprises an identifier of the user, a list of commands that the user is approved to execute, and a time for executing the command.

5. The system of claim 1, wherein the encoded message is formatted as a visual code, the simplex communication output device comprises a display monitor, and the simplex communication input device comprises a camera.

6. The system of claim 1, wherein a private key enables an approver to sign a digital certificate which is incorporated in the encoded message, and a corresponding public key enables the air gapped computer system to verify that the approver signed the digital certificate to approve of the user executing the command.

7. The system of claim 1, wherein a public key enables encrypting the encoded message and a corresponding private key enables the air-gapped computer system to decrypt the encrypted message.

8. A computer-implemented method for access control for executing commands on air-gapped computer systems, the computer-implemented method comprising:

determining whether a role-based access control system permits a user to execute a command on an air-gapped computer system, in response to receiving a request from the user to execute the command;

prompting a number of approvers to determine whether to approve of the user executing the command, in response to a determination that the role-based access control system permits the user to execute the command;

encoding the command and incorporating the encoded command in an encoded message, in response to a determination that a required number of approvers have approved of the user executing the command;

communicating, by a simplex communication output device, the encoded message to a simplex communication input device for the air-gapped computer system; and enabling execution of the command by one of requesting the air-gapped computer system to execute the command, and providing the user with an access token, received from the air-gapped computer system, which enables the user to physically access the air-gapped computer system and execute the command.

9. The computer-implemented method of claim 8, wherein an approver signs a digital certificate to approve of the user executing the command.

10. The computer-implemented method of claim 8, wherein the number of approvers prompted to determine whether to approve of the user executing the command and the required number of approvers who have approved of the user executing the command are based on a sensitivity of executing the command.

11. The computer-implemented method of claim 8, wherein the encoded message comprises an identifier of the user, a list of commands that the user is approved to execute, and a time for executing the command.

12. The computer-implemented method of claim 8, wherein the encoded message is formatted as a visual code, the simplex communication output device comprises a display monitor, and the simplex communication input device comprises a camera.

13. The computer-implemented method of claim 8, wherein a private key enables an approver to sign a digital certificate which is incorporated in the encoded message, and a corresponding public key enables the air gapped computer system to verify that the approver signed the digital certificate to approve of the user executing the command.

14. The computer-implemented method of claim 8, wherein a public key enables encrypting the encoded message and a corresponding private key enables the air-gapped computer system to decrypt the encrypted message.

15. A computer program product, comprising a non-transitory computer-readable medium having a computer-readable program code embodied therein to be executed by one or more processors, the program code including instructions to:

determine whether a role-based access control system permits a user to execute a command on an air-gapped computer system, in response to receiving a request from the user to execute the command;

prompt a number of approvers to determine whether to approve of the user executing the command, in response to a determination that the role-based access control system permits the user to execute the command;

encode the command and incorporate the encoded command in an encoded message, in response to a determination that a required number of approvers have approved of the user executing the command;

communicate, by a simplex communication output device, the encoded message to a simplex communication input device for the air-gapped computer system; and enable execution of the command by one of requesting the air-gapped computer system to execute the command, and providing the user with an access token, received from the air-gapped computer system, which enables the user to physically access the air-gapped computer system and execute the command.

16. The computer program product of claim 15, wherein an approver signs a digital certificate to approve of the user executing the command.

17. The computer program product of claim 15, wherein the number of approvers prompted to determine whether to approve of the user executing the command and the required number of approvers who have approved of the user executing the command are based on a sensitivity of executing the command.

18. The computer program product of claim 15, wherein the encoded message comprises an identifier of the user, a list of commands that the user is approved to execute, and a time for executing the command, is formatted as a visual code, and the simplex communication output device comprises a display monitor, while the simplex communication input device comprises a camera.

19. The computer program product of claim 15, wherein a private key enables an approver to sign a digital certificate which is incorporated in the encoded message, and a corresponding public key enables the air gapped computer system to verify that the approver signed the digital certificate to approve of the user executing the command.

20. The computer program product of claim 15, wherein a public key enables encrypting the encoded message and a corresponding private key enables the air-gapped computer system to decrypt the encrypted message.

* * * * *